(12) United States Patent
Sanderson et al.

(10) Patent No.: US 6,717,700 B1
(45) Date of Patent: Apr. 6, 2004

(54) METHOD AND SYSTEM FOR ADJUSTING BINARY IMAGES

(75) Inventors: Thomas A. Sanderson, Webster, NY (US); Ying-wei Lin, Penfield, NY (US)

(73) Assignee: Xerox Corporation, Rochester, NY (US)

( * ) Notice: Subject to any disclaimer, the term of this patent is extended or adjusted under 35 U.S.C. 154(b) by 0 days.

(21) Appl. No.: 09/345,740

(22) Filed: Jul. 1, 1999

(51) Int. Cl.[7] .................................................. G06K 9/36
(52) U.S. Cl. ...................................... 358/3.21; 358/3.05
(58) Field of Search ......................... 358/1.9, 3.2–3.21, 358/3.01–3.05, 461

(56) References Cited

U.S. PATENT DOCUMENTS

| 5,208,871 A | 5/1993 | Eschbach |
| 5,226,094 A | 7/1993 | Eschbach |
| 5,243,443 A | 9/1993 | Eschbach |
| 5,245,678 A | 9/1993 | Eschbach et al. |
| 5,270,836 A | 12/1993 | Kang |
| 5,278,670 A | 1/1994 | Eschbach |
| 5,325,211 A | 6/1994 | Eschbach |
| 5,363,213 A | 11/1994 | Coward et al. |
| 5,535,019 A | 7/1996 | Eschbach |
| 5,553,171 A | 9/1996 | Lin et al. |
| 5,565,994 A | 10/1996 | Eschbach |
| 5,621,546 A | 4/1997 | Klassen et al. |
| 5,666,470 A | 9/1997 | Parker |
| 5,689,586 A | 11/1997 | Lin |
| 5,724,455 A | 3/1998 | Eschbach |
| 5,748,785 A | 5/1998 | Mantell et al. |
| 6,345,128 B1 * | 2/2002 | Stokes ........................ 382/254 |
| 6,515,770 B1 * | 2/2003 | Rao et al. .................. 358/3.13 |

* cited by examiner

Primary Examiner—Thomas D. Lee
Assistant Examiner—Stephen Brinich
(74) Attorney, Agent, or Firm—Oliff & Berridge, PLC

(57) ABSTRACT

A method and system which converts an electronic binary image to another electronic binary image by compensating for the differences between printer responses so that a target printer can print the image to emulate how the image would appear if printed by an originally-intended printer or another printer. A print-ready binary image is inputted into a print and scan simulation circuit which electronically simulates the printing and scanning of the image data. The print and scan simulation circuit converts the binary image data to gray scale image data. The gray scale image data is then processed by a tone response correction circuit. The tone response correction circuit alters the gray scale image data based on the difference between the tone reproduction curves of two printers, such as an originally-intended printer and a target printer. This changes the value of each pixel so that it ultimately yields the same density on the target printer when it is converted to binary form and printed as it would if the original binary image were printed on the originally-intended printer. This altered gray scale image data is then sent to a binarization circuit which converts the gray scale image data to a binary image. This binary image may then be sent to a printer, such as the target printer, so that the quality of the printed binary image simulates how it would have been printed on the originally intended printer.

43 Claims, 3 Drawing Sheets

| PRINTER A | PRINTER B |
|---|---|
| 0 | 0 |
| 1 | 1 |
| 2 | 2 |
| 100 | 80 |
| 101 | 80 |
| 102 | 82 |
| 103 | 83 |
| 104 | 86 |
| 105 | 88 |
| 150 | 150 |
| 170 | 190 |
| 171 | 191 |
| 172 | 191 |
| 173 | 191 |
| 174 | 192 |
| 255 | 255 |

FIG. 3

METHOD AND SYSTEM FOR ADJUSTING BINARY IMAGES

FIELD OF THE INVENTION

The present invention relates to the correction of a binary image to compensate for differences in printer responses. More specifically, the present invention relates to the correction of a binary electronic image file so that a target printer prints a binary image similar to another printer, such as the printer for which the binary image was originally created.

BACKGROUND OF THE INVENTION

The quality of a printed image from a binary image file depends significantly on the compatibility between the conditions surrounding the creation of the binary file and the tone reproduction characteristics of the printer. When electronic binary images are created by a binary image creation device, such as a scanner, the device may create the image with a specific printer model in mind. For example, a scanner may scan an original image at a desired resolution and assign gray image data such as relative darkness numbers from 0 to $2^n$ for each pixel, where $2^n$ is the number of gray gradations. To create a binary image, that information may undergo half-toning or error diffusion and be converted into a binary format, where each binary pixel is assigned a 0 or a 1. During the process from the initial scanning to the final creation of the binary file, a tone response of a specific printer model is typically assumed.

As each printer has a different tone response, the same binary image will appear different when it is printed on different printers. In fact, the printing of binary images by printers for which they were not originally generated can cause many image quality problems, such as darkness shifts, spotting or mottling, and half-tone break-up. However, in today's electronic age with more scanners and printers becoming available on network systems, the printer that is used to print an binary image is rarely the printer for which the image was specifically created. Therefore, the print quality of many of these images suffers.

This problem is further magnified when the resolution of the printer at which the image is printed does not match the resolution of the image when it was originally created. When the resolution of the image is changed, image imperfections, such as density inconsistencies, scaling errors, Moire artifacts, and darkness shifts, that give the image a different appearance can be further magnified when they are printed on a printer for which they were not specifically created. While, prior patents, such as U.S. Pat. Nos. 5,553,171, 5,270,836, 5,363,213 and 5,226,094, partially corrects these image imperfections, they do not solve them entirely or address the problem when the image is printed on a printer for which it was not intended. A solution was thus needed to ensure print consistency of binary images across printing devices and when printing on a printer other than the printer for which the binary image was created.

On some occasions when a user desires to print a specific binary image, the user may be fortunate enough to be able to have access to the printer that was the originally-intended printer for that image. However, it is well known that printers are not 100% reliable, and replacement or substitute printers of a different type may be used during temporary periods. The replacement and substitute printers may therefore be subject to the image quality problems described above. A solution to make replacement or substitute printer like the originally-intended printer was thus needed.

Further, there may be situations where a user prefers the image quality of a specific binary image printed on a specific or desired printer over the originally-intended printer or any other printer. For example, the preferred printer may exaggerate or lessen the contrast of features in the image as compared to the originally-intended printer, and may not be adversely affected by any image quality problems. Thus, the user may want the originally-intended printer or any other printer to model the responses of another known printer. Further, there may be other circumstances where a user desires one printer to behave like another. This may even occur when the binary image is not formed with a specific printer model in mind or when the user is not aware of the specific printer model assumed by the scanner. In such cases, the user may just want one printer to emulate the results obtained by a different printer. However, the prior art fails to include a solution that satisfies these objectives. Accordingly, such a solution was needed.

SUMMARY

Accordingly, it is an object of the present invention to provide a method and a system which overcomes the limitations of the prior art.

It is an object of the present invention to correct binary images so that a printer, other than the one which the image was created for, can provide enhanced print quality. The invention accomplishes this in such a way that a target printer can mimic the response quality of the printer for which the image was created.

It is an object of the present invention to modify binary images so that the quality of the images that are ultimately printed becomes more of a function of the original images themselves and less of a function of differences in printers and printer responses.

It is an object of the present invention to provide a method for altering a print-ready binary image file. The method includes converting the print-ready binary image file to gray scale image data so that each pixel has a grayness value. The grayness value of the pixels of the gray scale image data are altered based on a relationship between a plurality of printer reproduction curves. The gray scale image data with the altered pixel grayness values is converted to a binary image file.

It is another object of the present invention to provide a method for altering a print-ready binary image file. The method includes providing a print-ready binary image produced by a process utilizing a first printer reproduction curve. The print-ready binary image is converted to gray scale image data, which is modified based on the difference between the first printer reproduction curve and a second reproduction curve. The modified gray scale image data is converted back into a binary image file.

It is yet another object of the present invention to provide a system for altering a print-ready binary image file so that it produces desired printed results from a target printer. The system includes print and scan circuitry, tone reproduction correction circuitry, and binarization circuitry. The print and scan circuitry receives the print-ready binary image file and converts the print-ready binary image file to gray scale image data wherein each pixel has a grayness value. The tone reproduction correction circuitry is functionally coupled to the print and scan circuitry and to the binarization circuitry. The tone reproduction correction circuitry alters the grayness value of the pixels of the gray scale image data based on a relationship between a plurality of printer reproduction curves. The binarization circuitry converts the gray scale image data with the altered pixel grayness values back into a binary image file.

BRIEF DESCRIPTION OF THE DRAWINGS

FIG. 3 shows a look-up table corresponding to the difference in tone reproduction curves between Printer A and Printer B.

DETAILED DESCRIPTION OF CERTAIN PREFERRED EMBODIMENTS

Figure 1:
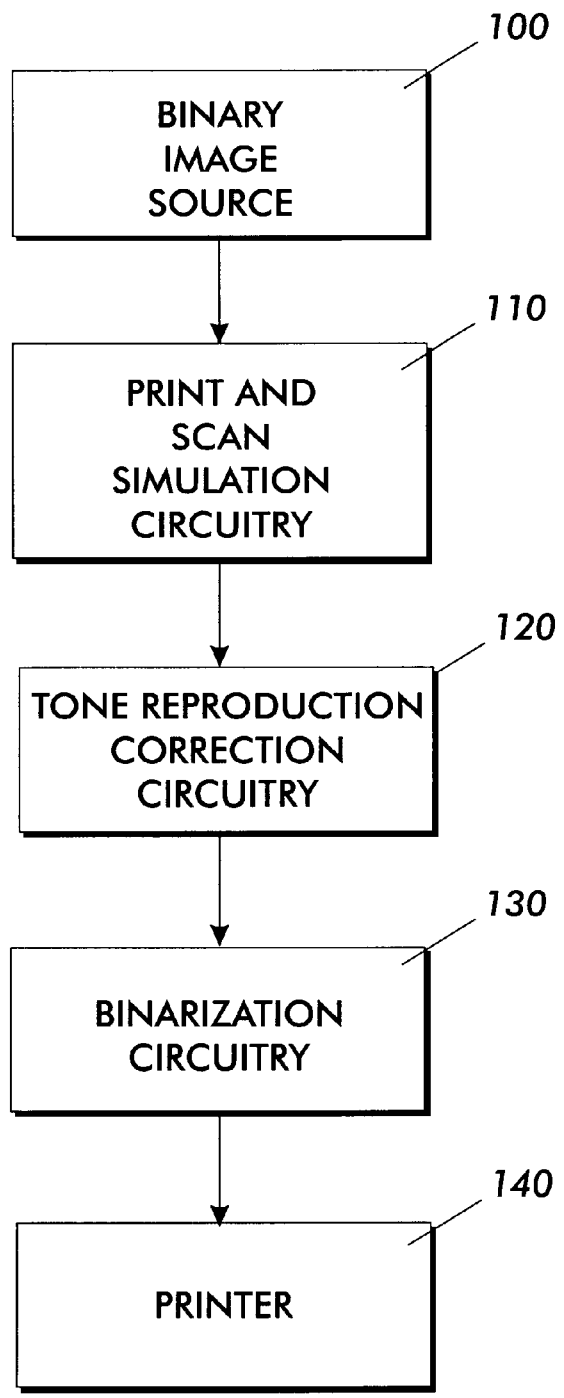
FIG. 1 illustrates a block diagram showing the system of the present invention.

The following is a detailed description of the drawings illustrating the present invention. In this description, as well as in the drawings, like reference numerals represent devices or circuitry or equivalent circuitry which perform the same or equivalent functions.

FIG. 1 illustrates the system of the present invention which converts an electronic binary image to another electronic binary image and compensates for the differences between printers so that a target printer can print the image to emulate how the image would appear if printed by an originally-intended printer or another printer. In sum, a print-ready binary image source 100 creates and/or enables the retrieval of a print-ready binary image. The binary image is then processed by the print and scan simulation circuitry 110. The print and scan simulation circuitry 110 electronically simulates the printing and scanning of the image data. During this step, the print and scan simulation circuit 110 converts the binary image data to gray scale image data. The gray scale image data is then processed by a tone reproduction correction circuitry 120 where the gray scale image data is altered based on the difference between the tone reproduction curves of two printers, such as an originally-intended printer and a target printer. The purpose of this step is to change the value of each pixel so that after binarization and printing on the target printer it ultimately yields the same density as it would if the original binary image were printed on the originally-intended printer. This altered gray scale image data is then processed by a binarization circuit 130 to convert the gray scale image into a binary image. This binary image data may then be sent to a printer 140, such as the target printer, so that the quality of this printed binary image simulates how this original print-ready image would have been printed on the originally-intended printer.

In accordance with the present invention, a print-ready binary image is acquired from a binary image source, either from the source generating the image or by being retrieved from storage. These binary images can be in any of a number of different formats including .TIF and .GIF formats. Commonly, these images will be created by a binary image creation device, such as a scanner. For example, a scanner first converts a hardcopy original image to digital gray scale image data at its desired resolution. This gray scale image data may be adjusted by the user to adjust brightness, contrast, and other attributes. Such adjustments may be made automatically or may be made through a user interface which can be part of the scanner itself or part of a program run by a computer electrically coupled to the scanner. By a process known as binarization, the gray scale image data for each pixel is converted into a binary format where each corresponding binary pixel is assigned a value of 0 or 1. That is, each binary pixel is assigned to be white or black to form a binary image file. This binarization is commonly done by the process of half-toning or error diffusion. In the binarization process, the tone response of a specific printer model is typically taken into consideration. This is done so that when the binary image is printed on a specific model printer or on another printer having that same printer tone reproduction curve, the printed image will more closely approximate the hardcopy original.

The tone response of a printer is usually determined in a separate calibration step. An electronic test target having a number of uniform patches at known pixel values is binarized and printed. The average density value of each patch on the printed output is measured. When the output density value is plotted against the input pixel value, the resulting curve is the tone reproduction curve of that printer. Note that since a binarization step is included, the tone reproduction curve depends on the binarization method used.

The print and scan simulation circuitry 110 receives this print-ready binary image file and converts it back into a gray-scale image data. It does this by simulating the printing of that image by creating a virtual representation of a page at a necessary accuracy, and by simulating the scanning of this virtual representation. Such processes and examples of print and scan simulation circuitry 110 are known in the art and different variations of such are found in U.S. Pat. No. 5,553,171 to Lin et al., U.S. Pat. No. 5,226,094 to Eschbach, U.S. Pat. No. 5,208,871 to Eschbach, and U.S. Pat. No. 5,363,213 to Coward et al., which are hereby incorporated by reference.

In one arrangement, the print simulation portion of the print and scan simulation circuitry 110 converts the binary image data to gray scale data corresponding to a virtual image. The virtual image is then sampled by a simulated scanner. The density of each pixel is measured and assigned a grayness value. This grayness value or gray-scale image data, corresponds to the number of levels of gray from 0 to $2^n$ for each given pixel, where n is the number of bits providing the number of distinct combinations corresponding to the possible levels of gray gradations. For example if n=8, there are 256 gradations, and the scale used to denote such gradations is from 0 to 255. Total white would be at one end of the scale and could be assigned the value 0. Total black would be at the end of the scale and would then have the value 255. Each pixel at the scanned resolution would have a value in the range between 0 and 255. Accordingly, this simulated scanning process determines a gray scale image value for each pixel to create gray-scale image file.

It should be noted that, if desired, the simulated printing or scanning step, or a step therebetween, may utilize an appropriate filter to avoid the production of undesirable print artifacts. The simulated scanning may occur at a new resolution or orientation if desired, and the pixel data may be altered to compensate for such changes in a manner that is known in the art. Additionally, one or both the simulated printing and scanning steps might contain weighing functions to pre-compensate for device artifacts or to enhance image quality.

The gray scale image data, comprising a grayness value in a fixed scale for each pixel, such as 0 to 255, is then processed by the tone reproduction correction circuitry 120. The tone reproduction correction circuitry 120 analyzes the grayness of each pixel in view of the difference between the printer reproduction curves of two printers, a first printer, Printer A, and a second Printer B. It then changes the grayness value of the pixels so that the relative density of each given pixel is approximately the same in either image. As a result, when this image is later converted into a binary format, Printer B prints the converted binary image so that the printed image appears similar to how the initial print-ready binary image file would look if it had been printed on Printer A.

Figure 2:
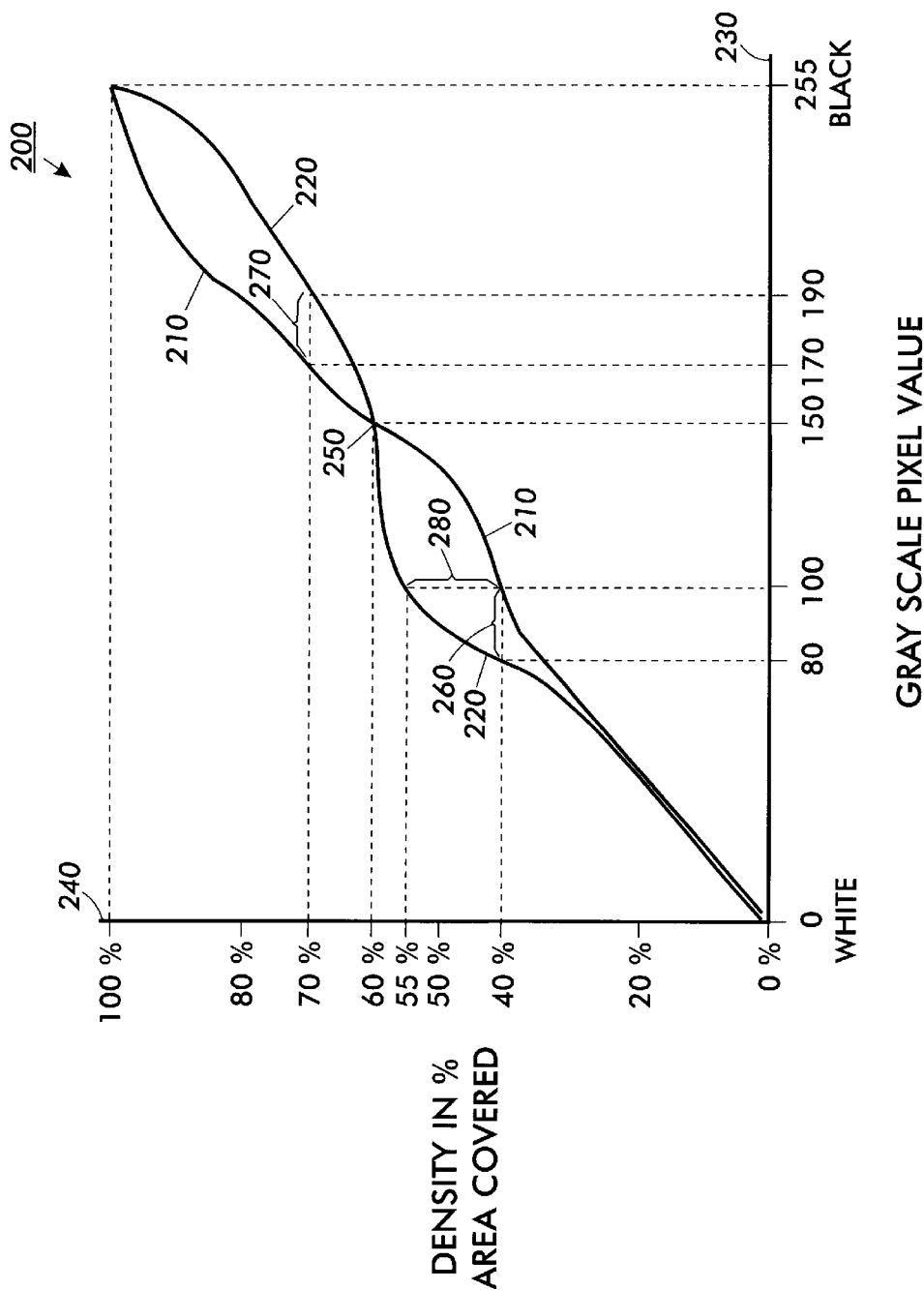
FIG. 2 shows the relationship between the tone reproduction curves of Printer A and Printer B.

FIG. 2 is a graph 200 showing the tone reproduction curves 210 and 220 of printer A and printer B, respectively. The tone reproduction curves 210 and 220 represent the relationship between the gray scale values of each pixel in a uniform area and the average density of its corresponding area on the output print. The horizontal axis 230 designates the value of a pixel (in a uniform area) along a given scale, for example, from 0 to $2^n$. Using the same 256 scale as an example, pure white may be designated by gray scale value 0 and pure black will then be designated by gray scale value 255. The vertical axis 240 designates the normalized average printer output density of a corresponding area associated with that printer as a percentage of area covered by ink. Thus, 0% density would mean that the area is entirely white, and 100% density would mean that the area is entirely black. Thus, a grayness value of 255 for a gray-scale pixel would correspond to an entirely black area.

As can be seen from FIG. 2, the tone reproduction curve 210 of Printer A differs from the tone reproduction curve 220 of Printer B. In this example, there is a point 250 where the print density value is the same for the same input pixel value for both Printer A and Printer B. At this point 250, an input pixel value of 150 gives a 60% percent area coverage on the output print, for both Printers A and B.

In this example, for input pixel values less than the point 250, Printer B gives a higher output density value than Printer A. In other words, to achieve the same output density value, a lower input pixel value is required on Printer B. For example, a input pixel value of 100 on Printer A would result in 40% percent area coverage on the output print. Using the tone reproduction curve for Printer B, the same input pixel value of 100 results in 55% area coverage. To achieve a 40% output density value on Printer B, an input pixel value of 80 is required.

In this same example, for input pixel values higher than the point 250, Printer B gives a lower output density value than Printer A. In other words, to achieve the same output density value, a higher input pixel value is required on Printer B. For example, a input pixel value of 170 on Printer A would result in 70% percent area coverage on the output print. Using the tone reproduction curve for Printer B, the same input pixel value of 170 results in about 65% area coverage. To achieve a 70% output density value on Printer B, an input pixel value of 190 is required. It is recognized that these tone reproduction curves are merely examples and that the invention is useful for any set of tone reproduction curves.

FIG. 3 is a look-up table 300 corresponding to the conversion values between the tone reproduction curves of Printer A and Printer B. This look-up table 300 is used to alter the gray scale image file, which was previously converted from the print-ready binary image file, so that the ultimately-produced binary image printed on Printer B appears similar to the original print-ready image printed on Printer A.

The look-up table 300 has two columns, column A 310 and Column B 320. Column A 310 corresponds to the gray scale pixel values associated with Printer A. Column B 320 corresponds to the gray scale pixel values associated with Printer B. Column A 310 includes a row for every possible gray scale pixel value within the range from pure white to pure black. Column B 320 includes a corresponding gray scale pixel value for each gray scale value in Column A. Using the same 256 scale as an example, pure white may be designated by 0 and pure black will then be designated by 255.

In each row, the gray scale pixel value in Column B is the value that is required to achieve the same output density according to printer reproduction curve B 220 as the corresponding gray scale value in Column A would achieve according to the tone reproduction curve 210 for Printer A. Accordingly, the gray scale pixel value in Column B can be determined for any gray scale pixel value for Column A from the graph in FIG. 2. This can be done by starting with a gray scale pixel value, for example 100, and extending vertically until the vertical line intersects with the tone reproduction curve 210 for Printer A. This intersection will be at a specific output print density, which is 40% in this example. A horizontal line drawn through that intersection will intersect with the tone reproduction curve 220 for Printer B. A vertical line drawn through this last intersection will extend through the horizontal axis, and the corresponding pixel value, which is 80 in the case, is noted. The pair of pixel values, 100 and 80, will form a row in the look-up table. The starting point of this process is repeated for all pixel values from 0 to 255, resulting in a complete look-up table.

Thus, for example, a gray scale pixel value of 100 on tone reproduction curve for Printer A would correspond to a gray scale pixel value of 80 for Printer B as they both result in a 40% area coverage on the output print. This is represented in the graph 200 by horizontal line segment 260. Similarly, a gray scale pixel value of 170 on tone reproduction curve for Printer A would correspond to a gray scale pixel value of 190 for Printer B as they both result in a 70% area coverage on the output print. This is represented in the graph 200 by horizontal line segment 270. A gray scale pixel value of 150 on tone reproduction curve for Printer A would correspond to a gray scale pixel value of 150 for Printer B as they both result in a 60% area coverage on the output print.

The tone reproduction curves may be provided or otherwise known, or they may be generated by measuring and plotting. Once these curves are established, the look-up tables may also be generated manually or automatically by comparing the two curves as described above so that each gray scale pixel value for Printer A will correspond to the gray scale pixel value for Printer B, such that they will produce the same output density. When generating the look-up table 300, less than all of the corresponding gray scale values for Printer B needs to be specifically determined. If desired, specific rows may be determined and interpolation may be used to complete the remaining rows.

The tone reproduction correction circuitry 120 is applied by selecting the desired or appropriate look-up table 300 for the desired conversion. This may be done by purely user input, by computer feedback, or by a combination of both. Thus, for example, a user may enter the "conversion from" printer and the "conversion to" printer and the appropriate look-up table can be accessed. The user may also merely select the desired look-up table for access. If the user has designated a target printer, the tone reproduction correction circuitry 120 may use that printer as the "conversion to" printer. Further, the original print-ready binary image itself can be provided with codes thereon that may help to identify what printer response or printer model the binary image creation device took into account when it created the image, and that data may be used to select the conversion from printer. If both automatic techniques are used, the tone reproduction correction circuitry 120 can be made to default to a corresponding look-up table unless the user overrides the selection.

Once the proper or desired look-up table 300 is selected, each gray scale pixel is converted from its gray scale value and is given an appropriate value according to the differences in gray scale values between the printer reproduction curves 210 and 220. For example, if a pixel in the image has a gray scale value of 100, it will be changed to 80. This conversion is graphically depicted by line segment 260. This conversion will make the pixel lighter in gray scale, but it will result in the same 40% density on Printer B when is ultimately converted to binary and printed. In the absence of such a conversion, a gray scale value of 100 would yield a much darker representation on Printer B, as depicted by the vertical line segment 280 terminating at a density of 55%. Similarly, a pixel in the image having a gray scale value of 170 will be changed to 190. This conversion is graphically depicted by line segment 270. This conversion will make the pixel darker in gray scale, but it will result in the same 70% density on Printer B when is ultimately converted to binary. It the absence of such a conversion, a gray scale value of 170 would yield a much lighter representation on Printer B. If a pixel in the image has a gray scale value of 150, it will not be changed because the corresponding value in the look-up table 300 is also 150. In sum, a conversion factor for each gray scale value is used to correct each pixel so that once binarized, the image prints from Printer B will be similar to the way Printer A would have printed the original print-ready binary image.

The binarization circuitry 130 processes this printer-compensated gray scale image data and converts it to a binary image file. This binarization step may be accomplished in any of a number of desired ways, such as by using the techniques of error diffusion, half-toning, or threshholding. A description of the binarization circuitry 130 and its functioning is known in the art and different variations of such are found in U.S. Pat. No. 5,553,171 to Lin et al., U.S. Pat. No. 5,226,094 to Eschbach, U.S. Pat. No. 5,208,871 to Eschbach, U.S. Pat. No. 5,245,678 to Eschbach et al., and U.S. Pat. No. 5,363,213 to Coward et al., and are hereby incorporated by reference. After the completion of this step, a print-ready binary image is created that has been revised to consider the differences in the tone reproduction curves of two printers. This revised binary image can then be fed into a printer 140 for producing an image on the document. The printer 140 is the target printer that the binary image was converted specifically for. The printer 140 that does the printing of the modified image will to a certain degree emulate the printed results that would be obtained if the original binary image were printed on its originally-intended printer. Thus, it can be seen that by knowing the printer responses of a target printer and an originally-intended printer, a binary image file can be converted to a pseudo-gray scale image file, altered to compensate for the printer response differences, and converted back into binary form, so that a target printer can print the image as intended.

Circuitry as used herein is defined as can be comprised of hardware, software programs or subroutines, or a combination thereof, and such can be implemented in conjunction with a digital computer or as a separate device, or can be incorporated into a digital copier.

An originally-intended printer is herein defined as a printer having a tone reproduction curve that is identical to or substantially equal to a tone reproduction curve used in creating the initial print-ready binary image by the binary image creation device. A newly-intended printer is herein defined as a printer, different from the originally-intended printer, that has a tone reproduction curve that prints the binary image as a desirable substitute for the originally-intended printer, regardless of whether the user is aware of the specific printer or printer reproduction curve that was used in the creation of the initial print-ready binary image by the binary image creation device. The term "intended printer" can mean an originally-intended printer or a newly-intended printer. A target printer is herein defined as the printer that will print the processed binary image file.

Accordingly, this method and system ensure print consistency of binary images across printing devices and when printing on a printer other than the printer for which the binary image was created. For example, if a user normally has access to the printer that is an intended printer for that image, but the printer is being dedicated to another user, is inconvenient to access, or is in need of repair or change in toner, this system can utilize the look-up table conversion between the intended printer and the target printer so that the printing of the processed binary image from target printer emulates the printing of the original print-ready binary image by the intended printer.

This system and method are also useful if a user prefers the image quality of a specific binary image printed on a preferred printer over any other printer. For example, the preferred printer may exaggerate or lessen the contrast of features in the image as compared to any other printer, even the originally-intended printer, and may not be adversely affected by any image quality problems. Thus, the user may want a target printer to model the responses of another known printer. This is beneficial even if the binary image is not formed with a specific printer model in mind or if the user is not aware of the specific printer model assumed by the scanner. In such cases, the user may just desire a target printer to emulate the results obtained by a different printer.

This process works within any marking technology. That is, this process is effective to provide enhanced images within any "type" of printer, such as inkjet or laser. However, even more exceptional results can be reached when crossing marking technologies where the differences between the reproduction curves of the printers are more likely to be extreme. For example, the results are more remarkable when you are going from one printer type to another, e.g., from inkjet to laser.

The gray scale range of 256 or $2^n$ gradations used herein was based on an 8 bit per pixel image. However, it is recognized that this process can be used for images with any number of bits per pixel.

Further, while the tone responses of the printers are referred to herein as tone reproduction "curves", such is merely semantical as the response may be linear in whole or in part.

This system and process is independent of the file formats chosen and is independent of the specific images chosen for printing.

The invention has been described in detail in connection with preferred embodiments. The preferred embodiments, however, are merely for example only and this invention is not restricted thereto. It would be easily understood by those skilled in the art that variations and modifications can be easily made within this scope of this invention as defined by the appended claims.

What is claimed is:

1. A method for altering a print-ready binary image, comprising:

converting the print-ready binary image file to gray scale image data, each pixel having a grayness value;

altering the grayness value of the pixels of the gray scale image data based on a relationship between a plurality of printer tone reproduction curves; and converting the gray scale image data with the altered pixel grayness values into a binary image file, wherein converting the print-ready binary image file to gray scale image data includes simulating printing of the print-read binary image and simulating scanning of the simulated printed image.

2. The method of claim 1, wherein altering the grayness values of the pixels includes altering the grayness value of the pixels of the gray scale image file based on the difference between the tone reproduction curves of two of a plurality of printers.

3. The method of claim 2, wherein the print-ready binary image file was created based on a first printer tone reproduction curve, and wherein altering the grayness value of the pixels includes altering the grayness value of the pixels of the gray scale image file based on the difference between the first printer tone reproduction curve and the tone reproduction curve of another printer.

4. The method of claim 3, wherein altering the grayness value of the pixels includes altering the grayness value of the pixels so that the pre-altered grayness value of the first printer tone reproduction curve and the post-altered grayness value of the tone reproduction curve of the another printer correspond to a substantially equal output density value.

5. The method of claim 4, wherein altering the grayness value of the pixels includes using a look up table and changing the grayness value of the pixels based on a corresponding grayness value in the look-up table.

6. The method of claim 1, wherein altering the grayness value of the pixels includes altering the grayness value of the pixels of the gray scale image file based on the difference between the tone reproduction curves of two of a plurality of printers.

7. The method of claim 1, wherein altering the grayness value of the pixels includes using a look up table and changing the grayness value of the pixels based on a corresponding grayness value in the look-up table.

8. The method of claim 7, further comprising the step of selecting a look-up table based on the responses of known printer devices.

9. A method for altering a print-ready binary image, comprising:

converting the print-ready binary image file to gray scale image data, each pixel having a grayness value;

altering the grayness value of the pixels of the gray scale image data based on a relationship between a plurality of printer tone reproduction curves; and converting the gray scale image data with the altered pixel grayness values into a binary image file, wherein, the print-ready binary image file was created based on a first printer tone reproduction curve, and altering the grayness value of the pixels includes altering the grayness value of the pixels of the gray scale image file based on the difference between the first printer tone reproduction curve and the tone reproduction curve of another printer.

10. The method of claim 9, wherein altering the grayness value of the pixels includes altering the grayness value of the pixels so that the pre-altered grayness value of a first printer tone reproduction curve and the post-altered grayness value of a second tone reproduction curve correspond to a substantially equal output density value.

11. The method of claim 10, wherein converting the gray scale image data with the altered pixel grayness values into a binary image file includes performing one of error diffusion and half-toning.

12. The method of claim 10, wherein altering the grayness value of the pixels includes using a look up table and altering the grayness value of the pixels based on a corresponding grayness value in the look up table.

13. A method for altering a print-ready binary image file, comprising:

providing a print-ready binary image produced by a process utilizing a first printer tone reproduction curve;

converting the print-ready binary image to gray scale image data;

modifying the gray scale image data based on the difference between the first printer tone reproduction curve and a second tone reproduction curve; and converting the modified gray scale image data to a binary image file.

14. The method of claim 13, further comprising the step of printing the processed file on a printer having a response according to the second tone reproduction curve.

15. The method of claim 14, wherein converting the print-ready binary image to gray scale image data includes simulating the printing of the print-ready binary image and simulating the scanning of the simulated printed image.

16. The method of claim 13, wherein modifying the gray scale image data includes modifying grayness values based on corresponding grayness values contained in a look-up table.

17. The method of claim 13, further comprising the step of selecting a look-up table corresponding to the first and second tone reproduction curves.

18. A system for altering a print-ready binary image file that was produced using a first printer tone reproduction curve so that it produces desired printed results from a target printer, the system comprising:

print and scan circuitry, the print and scan circuitry receiving the print-ready binary image file and converting the print-ready binary image file to gray scale image data wherein each pixel has a grayness value;

tone reproduction correction circuitry, the tone reproduction correction circuitry functionally coupled to the print and scan circuitry for altering the grayness value of the pixels of the gray scale image data based on a difference between the first printer reproduction curve and a second tone reproduction curve; and binarization circuitry, said binarization circuitry functionally coupled to the tone reproduction correction circuitry and converting the gray scale image data with the altered pixel grayness values to a binary image file.

19. The system of claim 18, wherein the tone reproduction circuitry includes a look-up table that includes data from at least the first and second tone reproduction curve.

20. The system of claim 19, wherein the tone reproduction circuitry includes a plurality of look-up tables.

21. A system for altering a print-ready binary image file so that it produces desired printed results from a target printer, the system comprising:

print and scan circuitry, the print and scan circuitry receiving the print-ready binary image file and converting the print-ready binary image file to gray scale image data wherein each pixel has a grayness value;

tone reproduction correction circuitry, the tone reproduction correction circuitry functionally coupled to the print and scan circuitry for altering the grayness value of the pixels of the gray scale image data based on a relationship between a plurality of printer reproduction curves; and binarization circuitry, said binarization circuitry functionally coupled to the tone reproduction correction circuitry and converting the gray scale image data with the altered pixel grayness values to a binary image file, wherein the tone reproduction circuitry includes a look-up table that includes data from the plurality of tone reproduction curves, the plurality of printer tone reproduction curves includes first and second printer tone reproduction curves and the look-up table provides a correlation between different grayness values of the pixels so that a pre-altered grayness value of the first printer tone reproduction curve and a post-altered grayness value of the second printer tone reproduction curve correspond to a substantially equal output density value.

22. A method for altering device-dependent binary image data, comprising:
  converting the device-dependent binary image data to gray scale image data, the grayscale image data having a plurality of pixels, each pixel having a grayness value;
  altering the grayness value of the pixels of the gray scale image data based on a relationship between a plurality of tone reproduction curves; and
  converting the gray scale image data with the altered pixel grayness values into altered device-dependent binary image data.

23. The method of claim 22, wherein converting the device-dependent image binary image data includes:
  simulating printing the device-dependent binary image data to form a simulated printed image; and
  simulating scanning the simulated printed image.

24. The method of claim 23, wherein altering the grayness values of the pixels includes altering the grayness value of the pixels of the gray scale image data based on a difference between tone reproduction curves of two of a plurality of printers.

25. The method of claim 24, wherein:
  the binary image data was created based on a tone reproduction curve of a first printer; and
  altering the grayness values of the pixels includes altering the grayness value of the pixels of the gray scale image data based on a difference between the tone reproduction curve of the first printer and a tone reproduction curve of a second printer.

26. The method of claim 25, wherein altering the grayness values of the pixels comprises altering the grayness values of the pixels, for each pixel, so that the grayness value of the tone reproduction curve of the first printer, and the altered grayness value of that pixel, when converted to output data based on tone reproduction curve of the second printer have a substantially equal output density values.

27. The method of claim 26, wherein altering the grayness values of the pixels includes altering the grayness value of the pixels based on a corresponding grayness value in a look-up table.

28. The method of claim 22, wherein altering the grayness values of the pixels includes altering the grayness value of the pixels of the gray scale image data based on a difference between the tone reproduction curves of a plurality of printers.

29. The method of claim 28, wherein altering the grayness values of the pixels includes altering the grayness value of the pixels of the gray scale image data based on a difference between tone reproduction curves of two of a plurality of printers.

30. The method of claim 28, wherein altering the grayness values of the pixels includes altering the grayness value of the pixels so that the pre-altered grayness value of a first printer tone reproduction curve and the post-altered grayness value of a second tone reproduction curve correspond to a substantially equal output density value.

31. The method of claim 30, wherein altering the grayness values of the pixels includes altering the grayness values of the pixels, for each pixel, so that the grayness value of the tone reproduction curve of the first printer, and the altered grayness value that pixel, when converted to output data based on tone reproduction curve of the second printer have a substantially equal output density values.

32. The method of claim 31, wherein converting the gray scale image data with the altered pixel grayness values into a binary image file includes performing one of error diffusion and half-toning.

33. The method of claim 22, wherein altering the grayness value of the pixels includes altering the grayness value of the pixels based on a corresponding grayness value in a look-up table.

34. The method of claim 33, further comprising selecting a look-up table based on responses of known image forming devices.

35. A method for altering device-dependent binary image data, the device dependent binary image data generated using a first reproduction curve, comprising:
  converting the device-dependent binary image data to gray scale image data;
  modifying the gray scale image data, based on a difference between the first tone reproduction curve and a second reproduction curve, to generate modified grayscale image data; and
  converting the modified gray scale image data to modified device-dependent binary image data.

36. The method of claim 35, further comprising outputting the modified binary image data using an image forming apparatus having a response according to the second tone reproduction curve.

37. The method of claim 36, wherein converting the device-dependent binary image data includes:
  simulating printing the device-dependent binary image to form a simulated image; and
  simulating scanning of simulated image.

38. The method of claim 35, wherein modifying the grayscale image data includes modifying grayness values based on corresponding grayness values contained in a look-up table.

39. The method of claim 35, further comprising selecting a look-up table corresponding to the first and second tone reproduction curves.

40. A system for altering device-dependent binary image data so that the altered device-dependent binary image data produces a desired output image from a target image forming apparatus, comprising:
  conversion circuitry, that receives the device-dependent binary image data and that converts the device-dependent binary image data to gray scale image data, where each pixel has a grayness value;
  tone reproduction correction circuitry that inputs the grayscale image data and that alters the grayness value of the pixels of the gray scale image data based on a relationship between a plurality of tone reproduction curves to form modified grayscale image data; and
  binarization circuitry that converts the modified gray scale image data to altered device-dependent binary image data.

41. The system of claim 40, wherein the tone reproduction circuitry includes a look-up table that includes data from the plurality of tone reproduction curves.

42. The system of claim 41, wherein the tone reproduction circuitry includes a plurality of look-up tables.

43. The system of claim 41, wherein the plurality of printer tone reproduction curves includes first and second printer tone reproduction curves and the look-up table provides a correlation between different grayness values of the pixels so that a pre-altered grayness value of the first printer tone reproduction curve and a post-altered grayness value of the second printer tone reproduction curve correspond to a substantially equal output densities value.

* * * * *